(12) United States Patent
McAlister

(10) Patent No.: US 8,919,377 B2
(45) Date of Patent: Dec. 30, 2014

(54) ACOUSTICALLY ACTUATED FLOW VALVE ASSEMBLY INCLUDING A PLURALITY OF REED VALVES

(75) Inventor: Roy Edward McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 13/584,562

(22) Filed: Aug. 13, 2012

(65) Prior Publication Data

US 2013/0206243 A1 Aug. 15, 2013

Related U.S. Application Data

(60) Provisional application No. 61/523,181, filed on Aug. 12, 2011.

(51) Int. Cl.
*F16K 15/16* (2006.01)
*F02M 69/04* (2006.01)

(52) U.S. Cl.
CPC .............. *F16K 15/16* (2013.01); *F02M 69/041* (2013.01)
USPC ...................... 137/625.3; 137/80; 137/599.03; 137/625.37

(58) Field of Classification Search
CPC ............................. F16K 15/16; F02M 69/041
USPC .................. 137/78.1, 828, 80, 625.3, 625.37, 137/599.03, 601.18, 601.2
See application file for complete search history.

(56) References Cited

U.S. PATENT DOCUMENTS

| | | | |
|---|---|---|---|
| 1,307,088 | A | 9/1919 | Drummond |
| 1,451,384 | A | 4/1923 | Whyte |
| 1,765,237 | A | 6/1930 | King |
| 2,255,203 | A | 9/1941 | Wiegand |
| 2,441,277 | A | 5/1948 | Lamphere |
| 2,721,100 | A | 10/1955 | Bodine, Jr. |
| 2,864,974 | A | 12/1958 | Beye |
| 3,058,453 | A | 10/1962 | May |
| 3,060,912 | A | 10/1962 | May |

(Continued)

FOREIGN PATENT DOCUMENTS

| | | |
|---|---|---|
| CN | 1411535 | 4/2003 |
| DE | 3443022 | 5/1986 |

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.

(Continued)

*Primary Examiner* — Craig Schneider
(74) *Attorney, Agent, or Firm* — Perkins Coie LLP

(57) ABSTRACT

The present disclosure is directed to an acoustically actuated flow valve having temperature-sensitive reed valves thereon. The flow valve and reed valves are configured to impart acoustical energy into a fluid flowing through the flow valve and one or more fluids downstream of the valve, leading to increased mixing of the fluids. The reed valves are further configured to be temperature-sensitive, thereby allowing more fluid to flow through the flow valve as the result of a change in temperature.

23 Claims, 5 Drawing Sheets

(56) References Cited

U.S. PATENT DOCUMENTS

| | | |
|---|---|---|
| 3,081,758 A | 3/1963 | May |
| 3,149,620 A | 9/1964 | Cataldo |
| 3,243,335 A | 3/1966 | Faile |
| 3,286,164 A | 11/1966 | De Huff |
| 3,361,161 A | 1/1968 | Schwartz |
| 3,373,724 A | 3/1968 | Papst |
| 3,391,680 A | 7/1968 | Benson |
| 3,520,961 A | 7/1970 | Suda et al. |
| 3,551,738 A | 12/1970 | Young |
| 3,594,877 A | 7/1971 | Suda et al. |
| 3,608,050 A | 9/1971 | Carman et al. |
| 3,689,293 A | 9/1972 | Beall |
| 3,762,170 A | 10/1973 | Fitzhugh |
| 3,802,194 A | 4/1974 | Tanasawa et al. |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,020,803 A | 5/1977 | Thuren et al. |
| 4,066,046 A | 1/1978 | McAlister |
| 4,095,580 A | 6/1978 | Murray et al. |
| 4,099,494 A | 7/1978 | Goloff et al. |
| 4,105,004 A | 8/1978 | Asai et al. |
| 4,116,389 A | 9/1978 | Furtah et al. |
| 4,122,816 A | 10/1978 | Fitzgerald et al. |
| 4,135,481 A | 1/1979 | Resler, Jr. |
| 4,172,921 A | 10/1979 | Kiefer |
| 4,183,467 A | 1/1980 | Sheraton et al. |
| 4,203,393 A | 5/1980 | Giardini |
| 4,281,797 A | 8/1981 | Kimata et al. |
| 4,293,188 A | 10/1981 | McMahon |
| 4,313,412 A | 2/1982 | Hosaka et al. |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,402,036 A | 8/1983 | Hensley et al. |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,514,712 A | 4/1985 | Mc Dougal |
| 4,528,270 A | 7/1985 | Matsunaga |
| 4,531,679 A | 7/1985 | Pagdin |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,700,891 A | 10/1987 | Hans et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | LaSota |
| 4,830,286 A | 5/1989 | Asslaender et al. |
| 4,834,033 A | 5/1989 | Larsen |
| 4,841,925 A | 6/1989 | Ward |
| 4,922,883 A | 5/1990 | Iwasaki |
| 4,932,263 A | 6/1990 | Wlodarczyk |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,069,189 A | 12/1991 | Saito |
| 5,072,617 A | 12/1991 | Weiss |
| 5,076,223 A | 12/1991 | Harden et al. |
| 5,095,742 A | 3/1992 | James et al. |
| 5,107,673 A | 4/1992 | Sato et al. |
| 5,109,817 A | 5/1992 | Cherry |
| 5,131,376 A | 7/1992 | Ward et al. |
| 5,134,982 A | 8/1992 | Hosoi |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,361,737 A | 11/1994 | Smith et al. |
| 5,377,633 A | 1/1995 | Wakeman |
| 5,390,546 A | 2/1995 | Wlodarczyk |
| 5,392,745 A | 2/1995 | Beck |
| 5,394,838 A | 3/1995 | Chandler |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,473,502 A | 12/1995 | Bonavia et al. |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,534,781 A | 7/1996 | Lee et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,598,699 A | 2/1997 | Few et al. |
| 5,605,125 A | 2/1997 | Yaoita |
| 5,607,106 A | 3/1997 | Bentz et al. |
| 5,608,832 A | 3/1997 | Pfandl et al. |
| 5,649,507 A | 7/1997 | Gregoire et al. |
| 5,662,389 A | 9/1997 | Truglio et al. |
| 5,676,026 A | 10/1997 | Tsuboi et al. |
| 5,694,761 A | 12/1997 | Griffin, Jr. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,704,553 A | 1/1998 | Wieczorek et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,769,049 A | 6/1998 | Nytomt et al. |
| 5,797,427 A | 8/1998 | Buescher |
| 5,806,581 A | 9/1998 | Haasch et al. |
| 5,816,217 A | 10/1998 | Wong |
| 5,832,906 A | 11/1998 | Douville et al. |
| 5,853,175 A | 12/1998 | Udagawa |
| 5,863,326 A | 1/1999 | Nause et al. |
| 5,876,659 A | 3/1999 | Yasutomi et al. |
| 5,896,842 A | 4/1999 | Abusamra |
| 5,915,272 A | 6/1999 | Foley et al. |
| 5,930,420 A | 7/1999 | Atkins et al. |
| 5,941,207 A | 8/1999 | Anderson et al. |
| 5,947,091 A | 9/1999 | Krohn et al. |
| 5,975,032 A | 11/1999 | Iwata |
| 5,983,855 A | 11/1999 | Benedikt et al. |
| 6,000,628 A | 12/1999 | Lorraine |

(56) References Cited

U.S. PATENT DOCUMENTS

| | | |
|---|---|---|
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | VanDyne |
| 6,029,640 A | 2/2000 | Bengtsson et al. |
| 6,042,028 A | 3/2000 | Xu |
| 6,062,498 A | 5/2000 | Klopfer |
| 6,081,183 A | 6/2000 | Mading et al. |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,131,607 A | 10/2000 | Cooke |
| 6,138,639 A | 10/2000 | Hiraya et al. |
| 6,155,212 A | 12/2000 | McAlister |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,318,306 B1 | 11/2001 | Komatsu |
| 6,335,065 B1 | 1/2002 | Steinlage et al. |
| 6,338,445 B1 | 1/2002 | Lambert et al. |
| 6,340,015 B1 | 1/2002 | Benedikt et al. |
| 6,360,721 B1 | 3/2002 | Schuricht et al. |
| 6,360,730 B1 | 3/2002 | Koethe |
| 6,378,485 B2 | 4/2002 | Elliott |
| 6,386,178 B1 | 5/2002 | Rauch |
| 6,443,373 B1 | 9/2002 | Portugues |
| 6,446,597 B1 | 9/2002 | McAlister |
| 6,453,660 B1 | 9/2002 | Johnson et al. |
| 6,455,173 B1 | 9/2002 | Marijnissen et al. |
| 6,455,451 B1 | 9/2002 | Brodkin et al. |
| 6,478,007 B2 | 11/2002 | Miyashita et al. |
| 6,483,311 B1 | 11/2002 | Ketterer et al. |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,517,623 B1 | 2/2003 | Brodkin et al. |
| 6,532,315 B1 | 3/2003 | Hung et al. |
| 6,536,405 B1 | 3/2003 | Rieger et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,550,458 B2 | 4/2003 | Yamakado et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,599,028 B1 | 7/2003 | Shu et al. |
| 6,615,810 B2 | 9/2003 | Funk et al. |
| 6,615,899 B1 | 9/2003 | Woodward et al. |
| 6,619,269 B1 | 9/2003 | Stier et al. |
| 6,621,964 B2 | 9/2003 | Quinn et al. |
| 6,626,164 B2 | 9/2003 | Hitomi et al. |
| 6,647,948 B2 | 11/2003 | Kyuuma et al. |
| 6,663,027 B2 | 12/2003 | Jameson et al. |
| 6,668,630 B1 | 12/2003 | Kuglin et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Enomoto et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,745,744 B2 | 6/2004 | Suckewer et al. |
| 6,748,918 B2 | 6/2004 | Rieger et al. |
| 6,749,043 B2 | 6/2004 | Brown et al. |
| 6,755,175 B1 | 6/2004 | McKay et al. |
| 6,756,140 B1 | 6/2004 | McAlister |
| 6,763,811 B1 | 7/2004 | Tamol, Sr. |
| 6,766,965 B2 | 7/2004 | D'Arrigo |
| 6,772,965 B2 | 8/2004 | Yildirim et al. |
| 6,776,352 B2 | 8/2004 | Jameson |
| 6,779,513 B2 | 8/2004 | Pellizzari et al. |
| 6,786,200 B2 | 9/2004 | Viele et al. |
| 6,796,516 B2 | 9/2004 | Maier et al. |
| 6,802,894 B2 | 10/2004 | Brodkin et al. |
| 6,811,103 B2 | 11/2004 | Gurich et al. |
| 6,814,313 B2 | 11/2004 | Petrone et al. |
| 6,832,472 B2 | 12/2004 | Huang et al. |
| 6,832,588 B2 | 12/2004 | Herden et al. |
| 6,841,309 B1 | 1/2005 | Alpay et al. |
| 6,845,920 B2 | 1/2005 | Sato et al. |
| 6,850,069 B2 | 2/2005 | McQueeney et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,883,490 B2 | 4/2005 | Jayne |
| 6,883,507 B2 | 4/2005 | Freen |
| 6,892,971 B2 | 5/2005 | Rieger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,940,213 B1 | 9/2005 | Heinz et al. |
| 6,954,074 B2 | 10/2005 | Zhu et al. |
| 6,955,154 B1 | 10/2005 | Douglas |
| 6,959,693 B2 | 11/2005 | Oda |
| 6,976,683 B2 | 12/2005 | Eckert et al. |
| 6,978,767 B2 | 12/2005 | Bonutti |
| 6,984,305 B2 | 1/2006 | McAlister |
| 6,993,960 B2 | 2/2006 | Benson |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,077,379 B1 | 7/2006 | Taylor |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,124,964 B2 | 10/2006 | Bui |
| 7,131,426 B2 | 11/2006 | Ichinose et al. |
| 7,137,382 B2 | 11/2006 | Zhu et al. |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,198,208 B2 | 4/2007 | Dye et al. |
| 7,201,136 B2 | 4/2007 | McKay et al. |
| 7,204,133 B2 | 4/2007 | Benson et al. |
| 7,214,883 B2 | 5/2007 | Leyendecker |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,272,487 B2 | 9/2007 | Christen et al. |
| 7,278,392 B2 | 10/2007 | Zillmer et al. |
| 7,284,543 B2 | 10/2007 | Kato et al. |
| 7,302,792 B2 | 12/2007 | Land et al. |
| 7,305,971 B2 | 12/2007 | Fujii |
| 7,308,889 B2 | 12/2007 | Post et al. |
| 7,309,029 B2 | 12/2007 | Boecking |
| 7,340,118 B2 | 3/2008 | Wlodarczyk et al. |
| 7,367,319 B2 | 5/2008 | Kuo et al. |
| 7,386,982 B2 | 6/2008 | Runkle et al. |

(56) References Cited

U.S. PATENT DOCUMENTS

| | | | |
|---|---|---|---|
| 7,395,146 B2 | 7/2008 | Ueda et al. |
| 7,404,395 B2 | 7/2008 | Yoshimoto |
| 7,409,929 B2 | 8/2008 | Miyahara et al. |
| 7,418,940 B1 | 9/2008 | Yi et al. |
| 7,481,043 B2 | 1/2009 | Hirata et al. |
| 7,484,369 B2 | 2/2009 | Myhre |
| 7,513,222 B2 | 4/2009 | Orlosky |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,625,531 B1 | 12/2009 | Coates et al. |
| 7,626,315 B2 | 12/2009 | Nagase |
| 7,627,416 B2 | 12/2009 | Batenburg et al. |
| 7,628,137 B1 | 12/2009 | McAlister |
| 7,628,145 B2 | 12/2009 | Ishibashi et al. |
| 7,650,873 B2 | 1/2010 | Hofbauer et al. |
| 7,690,352 B2 | 4/2010 | Zhu et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,721,697 B2 | 5/2010 | Smith et al. |
| 7,728,489 B2 | 6/2010 | Heinz et al. |
| 7,849,833 B2 | 12/2010 | Toyoda |
| 7,880,193 B2 | 2/2011 | Lam |
| 7,886,993 B2 | 2/2011 | Bachmaier et al. |
| 7,898,258 B2 | 3/2011 | Neuberth et al. |
| 7,900,850 B2 | 3/2011 | Zengerle et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 8,039,412 B2 | 10/2011 | Park et al. |
| 8,069,836 B2 | 12/2011 | Ehresman |
| 8,074,625 B2 | 12/2011 | McAlister |
| 8,091,528 B2 | 1/2012 | McAlister |
| 8,091,536 B2 | 1/2012 | Munshi et al. |
| 8,132,560 B2 | 3/2012 | Ulrey et al. |
| 8,147,599 B2 | 4/2012 | McAlister |
| 8,192,852 B2 | 6/2012 | McAlister |
| 8,239,114 B2 | 8/2012 | Goeke et al. |
| 8,312,759 B2 | 11/2012 | McAlister |
| 8,371,273 B2 | 2/2013 | Ulrey et al. |
| 8,416,552 B2 | 4/2013 | Gefter et al. |
| 8,441,361 B2 | 5/2013 | McAlister |
| 8,469,009 B2 | 6/2013 | Munshi et al. |
| 8,511,259 B2 | 8/2013 | Ambrosini et al. |
| 8,538,663 B2 | 9/2013 | Jung et al. |
| 8,578,902 B2 | 11/2013 | Hampton et al. |
| 2002/0017573 A1 | 2/2002 | Sturman |
| 2002/0070287 A1 | 6/2002 | Jameson |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2003/0012985 A1 | 1/2003 | McAlister |
| 2003/0127531 A1 | 7/2003 | Hohl |
| 2004/0008989 A1 | 1/2004 | Hung |
| 2004/0084017 A1 | 5/2004 | Viele et al. |
| 2004/0084026 A1 | 5/2004 | Zhu et al. |
| 2004/0187847 A1 | 9/2004 | Viele et al. |
| 2005/0098663 A1 | 5/2005 | Ishii |
| 2005/0126537 A1 | 6/2005 | Daniels et al. |
| 2005/0255011 A1 | 11/2005 | Greathouse et al. |
| 2005/0257776 A1 | 11/2005 | Bonutti |
| 2006/0005738 A1 | 1/2006 | Kumar |
| 2006/0005739 A1 | 1/2006 | Kumar |
| 2006/0016916 A1 | 1/2006 | Petrone et al. |
| 2006/0037563 A1 | 2/2006 | Raab et al. |
| 2006/0108452 A1 | 5/2006 | Anzinger et al. |
| 2006/0169244 A1 | 8/2006 | Allen |
| 2007/0186903 A1 | 8/2007 | Zhu et al. |
| 2007/0189114 A1 | 8/2007 | Reiner et al. |
| 2007/0240404 A1* | 10/2007 | Pekrul et al. ............ 60/282 |
| 2007/0283927 A1 | 12/2007 | Fukumoto et al. |
| 2008/0017170 A1 | 1/2008 | Moroi et al. |
| 2008/0072871 A1 | 3/2008 | Vogel et al. |
| 2008/0081120 A1 | 4/2008 | Van Ooij et al. |
| 2008/0098984 A1 | 5/2008 | Sakamaki |
| 2009/0078798 A1 | 3/2009 | Gruendl et al. |
| 2009/0093951 A1 | 4/2009 | McKay et al. |
| 2009/0101114 A1 | 4/2009 | Czekala et al. |
| 2009/0264574 A1 | 10/2009 | Van Ooij et al. |
| 2010/0020518 A1 | 1/2010 | Bustamante |
| 2010/0077986 A1 | 4/2010 | Chen |
| 2010/0108023 A1 | 5/2010 | McAlister |
| 2010/0183993 A1 | 7/2010 | McAlister |
| 2011/0036309 A1 | 2/2011 | McAlister |
| 2011/0042476 A1 | 2/2011 | McAlister |
| 2011/0048371 A1 | 3/2011 | McAlister |
| 2011/0048374 A1 | 3/2011 | McAlister |
| 2011/0056458 A1 | 3/2011 | McAlister |
| 2011/0057058 A1 | 3/2011 | McAlister |
| 2011/0146619 A1 | 6/2011 | McAlister |
| 2011/0210182 A1 | 9/2011 | McAlister |
| 2011/0233308 A1 | 9/2011 | McAlister |
| 2011/0253104 A1 | 10/2011 | McAlister |
| 2011/0297753 A1 | 12/2011 | McAlister et al. |
| 2012/0180743 A1 | 7/2012 | Burrows et al. |
| 2013/0149621 A1 | 6/2013 | McAlister |

FOREIGN PATENT DOCUMENTS

| | | |
|---|---|---|
| DE | 19731329 | 6/1998 |
| DE | 10356133 | 7/2005 |
| DE | 102005060139 | 6/2007 |
| DE | 102006021192 | 11/2007 |
| EP | 392594 A2 | 10/1990 |
| EP | 671555 | 9/1995 |
| EP | 1972606 | 9/2008 |
| GB | 1038490 A | 8/1966 |
| JP | 61-023862 A | 2/1986 |
| JP | 02-259268 A | 10/1990 |
| JP | 08-049623 A | 2/1996 |
| KR | 2007-0026296 A | 3/2007 |
| KR | 2008-0073635 A | 8/2008 |
| WO | WO-2008-017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.
"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.
"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.
"SmartPlugs—Aviation." SmartPlugs.com. Published: Sep. 2000. Accessed: May 31, 2011. <http://www.smartplugs.com/news/aeronews0900.htm>. pp. 1-3.
Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.
Birchenough, Arthur G. "A Sustained-arc Ignition System for Internal Combustion Engines." Nasa Technical Memorandum (NASA TM-73833). Lewis Research Center. Nov. 1977. pp. 1-15.
Britt, Robert Roy. "Powerful Solar Storm Could Shut Down U.S. For Months—Science News Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.
Brooks, Michael. "Space Storm Alert: 90 Seconds from Catastrophe." NewScientist. Mar. 23, 2009. pp. 1-7.

(56) References Cited

OTHER PUBLICATIONS

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 1-10.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

U.S. Appl. No. 13/843,976, McAlister.

U.S. Appl. No. 13/797,351, McAlister.

U.S. Appl. No. 13/844,240, McAlister.

U.S. Appl. No. 13/844,488, McAlister.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2011/024778 Applicant: McAlister Technologies, LLC.; Date of Mailing: Sep. 27, 2011 (10 pages).

International Search Report and Written Opinion for Application No. PCT/US2010/054364; Applicant: McAlister Technologies, LLC.; Date of Mailing: Aug. 22, 2011, 8 pages.

Supplementary European Search Report for Application No. EP 10846264.9; Applicant McAlister Technologies, LLC.; Date of Mailin Oct. 2, 2013, 5 pages.

* cited by examiner

ACOUSTICALLY ACTUATED FLOW VALVE ASSEMBLY INCLUDING A PLURALITY OF REED VALVES

CROSS-REFERENCE TO RELATED APPLICATION(S)

The present application claims priority to and the benefit of U.S. Provisional Patent Application No. 61/523,181, filed Aug. 12, 2011, and entitled "ACOUSTICALLY ACTUATED FLOW VALVE HAVING TEMPERATURE-SENSITIVE REED VALVES," the entirety of which is incorporated by reference herein.

TECHNICAL FIELD

The present disclosure relates generally to flow valves for regulating the flow of a fluid, more specifically to flow valves actuated to impart a fluid with acoustical energy.

DETAILED DESCRIPTION

The present disclosure describes devices, systems, and methods for providing a flow control valve configured to impart or modify acoustical forces to induce vibration in various types of fluids. The disclosure further describes associated systems, assemblies, components, and methods regarding the same. For example, one embodiment described below is directed generally to a flow control valve in a fuel injector that can optimize the ignition and combustion of various fuels based on combustion chamber conditions, engine load requirements, etc. Certain details are set forth in the following description and in FIGS. 1-5 to provide a thorough understanding of various embodiments of the disclosure. However, other details describing well-known structure, and systems often associated with internal combustion engines, valves, injectors, igniters, and/or other aspects of combustion systems are not set forth below to avoid unnecessarily obscuring the description of various embodiments of the disclosure. Thus, it will be appreciated, that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

Figure 1:
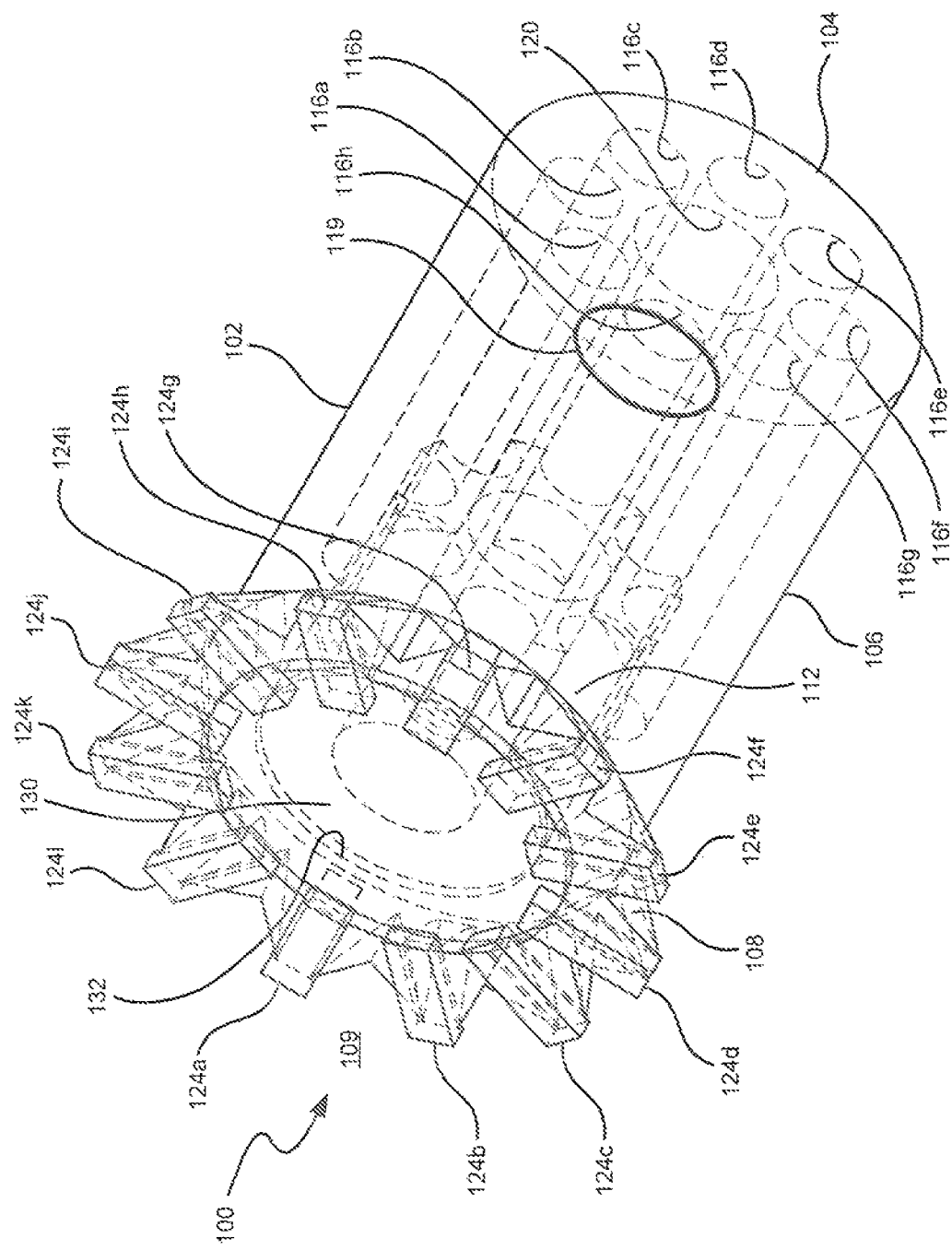
FIG. 1 is an isometric cross-sectional side view of a flow valve assembly configured in accordance with an embodiment of the disclosure.

FIG. 1 depicts an isometric cross-sectional view of a flow valve assembly 100 configured in accordance with an embodiment of the disclosure. The flow valve assembly 100 includes a body 102 having a middle portion 106 extending between a base portion 104 and a face portion 108. A plurality of tubes 116a-h extend through the body 102 from the base portion 104 through the middle portion 106 and empty into a chamber 112 adjacent to the face portion 108. A valve 132 disposed in the face portion 108 is coupled to a valve actuator 120 disposed in a bore 119 that extends the length of the body 102. The valve actuator 120 can be connected to an external actuator (not shown) that may be located adjacent to the base portion 104. In other embodiments, the valve actuator 120 can be connected to any other mechanical movement means. The external actuator can displace the valve actuator 120 in the bore 119 such that the valve actuator 120 and the valve 132 oscillate axially between at least a first position and a second position, in the first position, the valve 132 is closed and the fluid flowing through the tubes 116a-h cannot flow out of the flow valve assembly 100 into the fluid space 109. In the second (or open) position, the valve 132 is displaced outward from the face portion 108 such that a gap is formed between the valve 132 and the face portion 108. The gap can allow a fluid flowing through the tubes 116a-h into the chamber 112, to flow out of the flow valve assembly 100 into a fluid space 109 adjacent and external to the valve face 130.

The oscillation of valve 132 can impart acoustical energy into a plurality of fluids in the fluid space 109. During operation, as the fluid flowing through the flow valve assembly 100 is allowed to flow into the fluid space 109 it has an innate acoustical frequency of movement. As discussed in further detail below, the acoustical frequency may be a sit-audible, audible, or ultrasonic frequency. The innate frequency of the fluid is dependent on numerous factors including, for example, the geometry of the fluid space 109 and the flow valve 132, the mechanism of displacing the flow valve 132, and the type, temperature, velocity, pressure, density, and viscosity of the fluid. The innate frequency can be altered via a cyclic impartation of energy to the fluids, as well as to one or more components in flow valve assembly 100. Imparting this acoustical energy alters the fluid pattern, shape, phase, and/or frequency to provide for improved mixture of fluids in the fluid space 109.

The flow control valve 100 also includes reed valves 124a-l, which can be circumferentially disposed on the valve face 130, can be carried by the body 102 or can be separated from the valve face 130 or the body 102 by a spacer, diaphragm 114 or physical space. The reed valves 124a-l can be configured to vibrate in response to a displacement of the valve 132 and valve actuator 120. The resulting oscillation of valve 132 and valve actuator 120 can result in the imparting of corresponding oscillations in the reed valves 124a-l. The oscillations of the reed valves 124a-l can impart acoustical energy or modify existing acoustical energy into a plurality of fluids flowing therearound. The plurality of fluids may comprise a first fluid that can flow through the tubes 116a-h of the flow valve assembly 100 into fluid space 109, and a second fluid in fluid space 109 that may be mixed with the first fluid. The acoustical or kinetic energy imparted or modified into the fluids in the fluid space 109 further alters the fluid pattern, shape, phase, and/or frequency to provide for improved mixture of fluids in the fluid space 109.

In the illustrated embodiment, the flow valve assembly 100 has a cylindrical shape and the reed valves are more or less perpendicular to the axial travel of valve 132. In other embodiments, however, the flow valve assembly 100 may be any suitable shape and reed valves 124 may be provided in various other geometric shapes, orientations, and relationships to optimize the fuel injection pattern, ignition, combustion, and oxidant utilization events including production of corona or Lorentz accelerated ion ignition. In some embodiments valve 132 controls fluid flow to ports controlled by reed valves 124 that accordingly, depending upon each spring's stiffness, may serve as the sole or principal way for fluid to flow into a certain region of space 109. Each individual valve 124 may have a specific spring constant or stiffness that determines the pressure at which it is accelerated outward or combinations of valves with the same spring constant may be used to produce certain injection patterns at one power level and another pattern at another power level in order to optimize oxidant utilization efficiency to maximize power production and/or fuel economy.

Illustratively in another embodiment, valve 132 may allow a fluid such as fuel to flow through one or more annular distributor passages to ports that are normally closed by reed valves 124a-l. Upon vibrating or multiple burst openings of valve 132, fluid pressure, such as pressure pulses, open one or more reed valves 124 depending upon their modulus of elasticity, section modulus and resulting "stiffness" to produce a pattern of fluid distribution in zone 109. Variation of the fluid pressure and/or cyclic frequency of fluid bursts from valve 132 provides for variation of the fluid distribution pattern projected into space 109 by reed valves 124.

Figure 2:
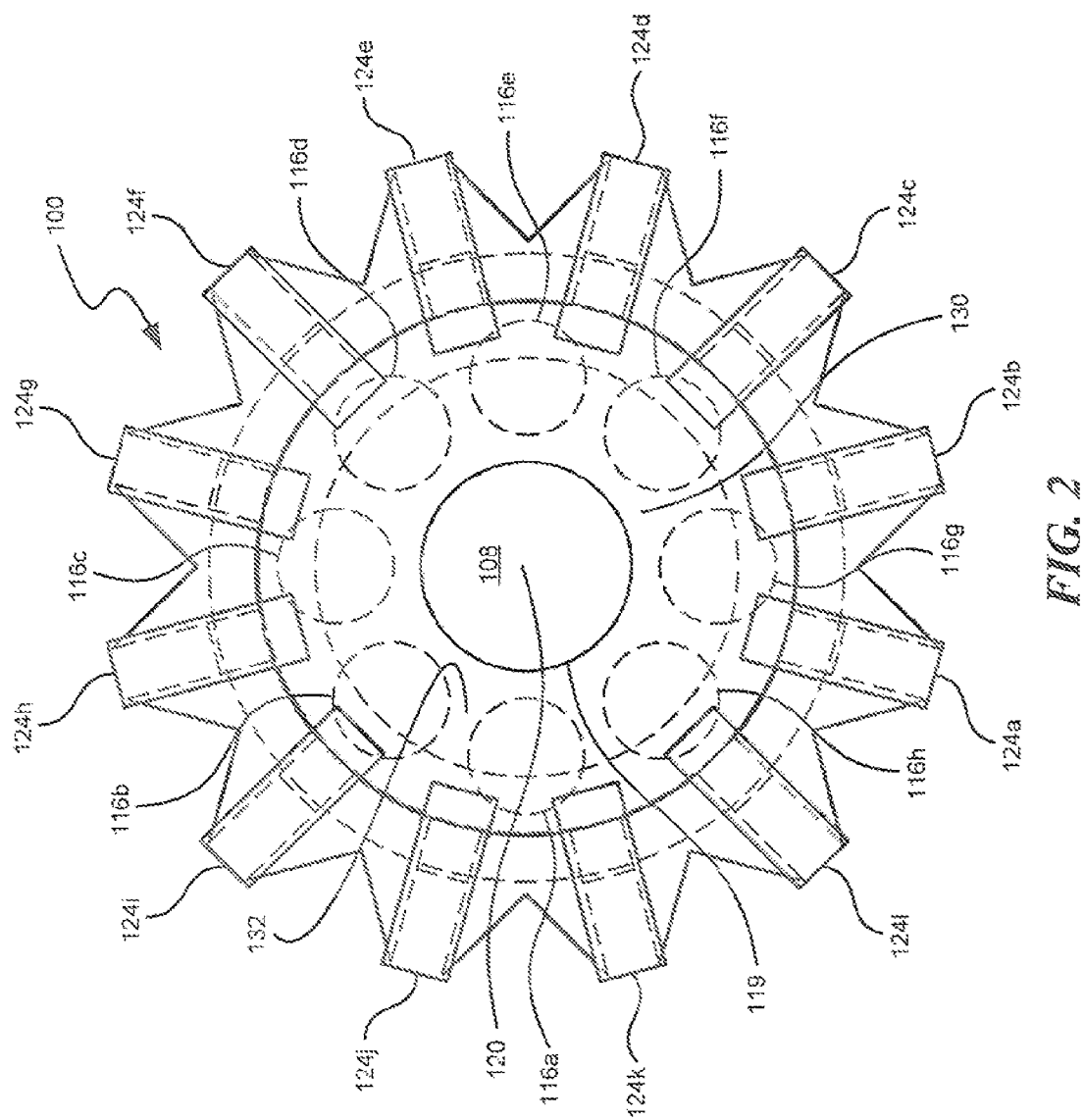
FIG. 2 is an end cross-sectional view of a flow valve assembly configured in accordance with an embodiment of the disclosure.

FIG. 2 depicts a cross-sectional end view of the face portion 108 of the flow valve assembly 100. The reed valves 124a-l are arranged around the circumference of the exterior surface of the face portion 108 upstream of the flow of the first fluid flowing through the flow valve assembly 100. The tubes 116a-h are arranged circumferentially throughout the body 102 around a bore 119. In the illustrated embodiment, the flow valve assembly 100 has a cylindrical shape, in other embodiments, however, the flow valve assembly 100 may be any suitable shape, such as a rectangle, cube, or sphere.

Figure 3:
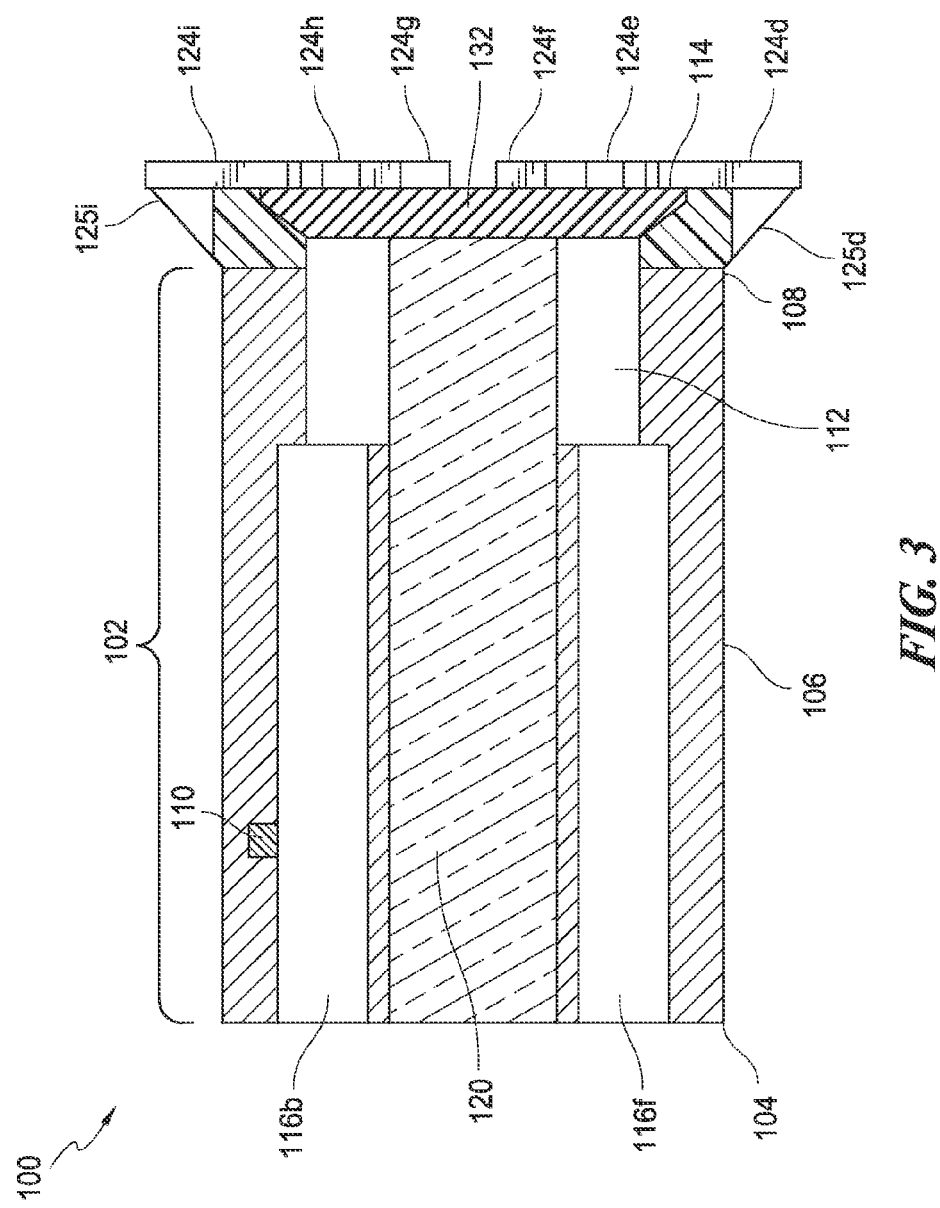
FIG. 3 is a partial cross-sectional side view of a flow valve assembly configured in accordance with an embodiment of the disclosure.

FIG. 3 depicts a partial cross-sectional side view of the flow valve assembly 100. Tubes 116b-f and reed valves 124d-i are visible in this view. A series of grooves are formed circumferentially around the face portion 108 and are configure such that each of the reed valves 124a-l covers a corresponding groove 125d-l. The grooves 125d-l can act as channels for a fluid entering the fluid space 109 when valve 132 is open. A fluid can enter the body 102 of the flow valve assembly 100 and flow through the tubes 116a-h, the chamber 112, and the valve 132. The movement of the valve 132 can impart acoustical energy resulting in vibration of the reed valves 124a-l. This vibration of reed valves 124a-l may be transmitted as acoustical energy into a plurality of fluids in the fluid space 109. Transmitting acoustical energy into the fluids in fluid space 109 can alter the pattern, shape, phase, and/or frequency of the fluids to provide for an increase of mixing of the fluids in the fluid space 109.

Figure 4:
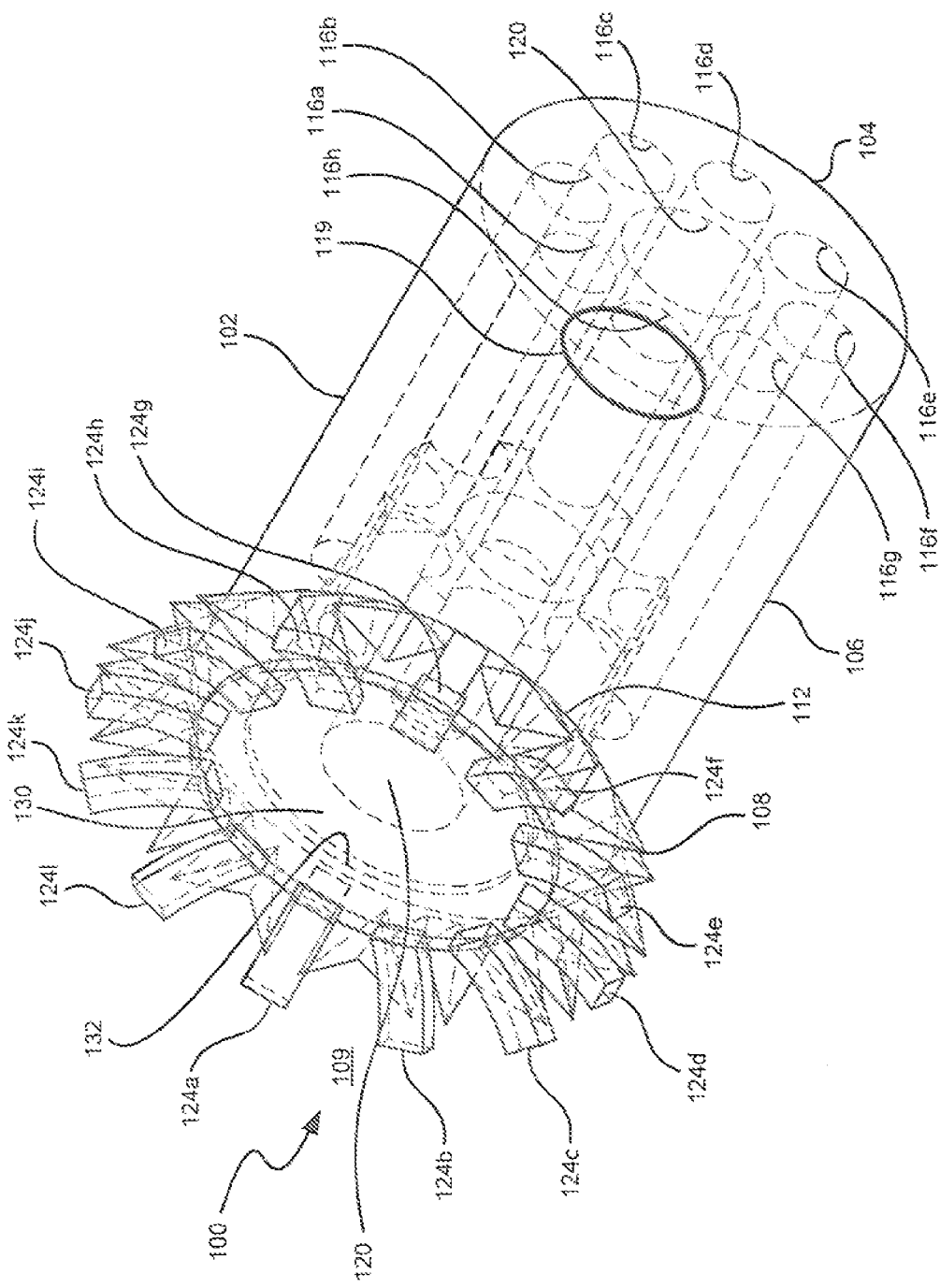
FIG. 4 is an isometric cross-sectional side view of a flow valve configured in accordance with another embodiment of the disclosure.
Figure 5:
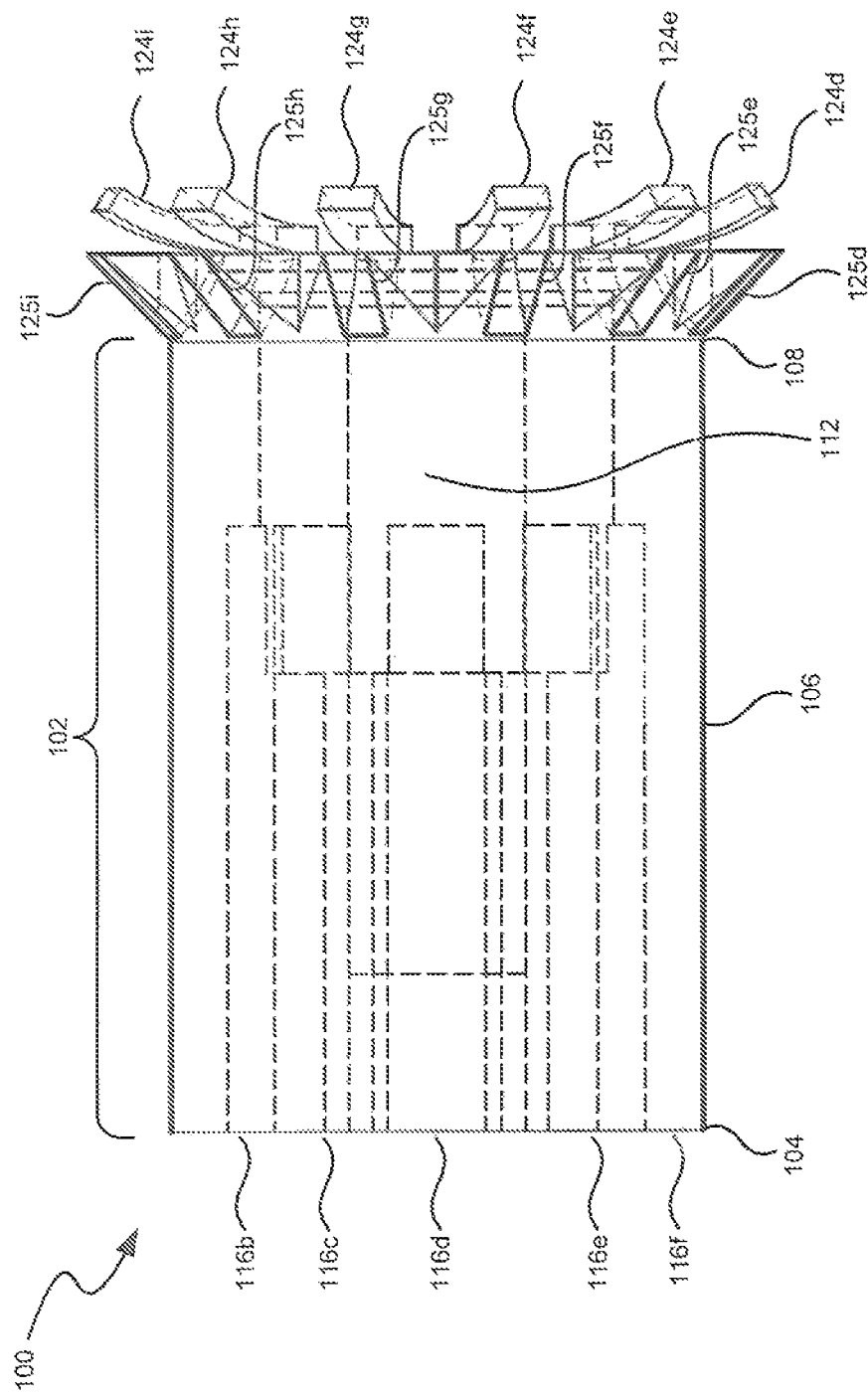
FIG. 5 is a partial cross-sectional side partial view of a flow valve assembly configured in accordance with another embodiment of the disclosure.

FIGS. 4 and 5 depict another embodiment of the flow control assembly 100 depicted in FIGS. 1 and 3, respectively. In the illustrated embodiment of FIGS. 4 and 5, the reed valves 124a-l comprise at least two metals wherein a first metal has a first coefficient of thermal expansion and a second metal has a second coefficient of thermal expansion different from the first coefficient of thermal expansion (i.e. a "bimetal"). Configuring the reed valves 124a-l to comprise a bimetal can result in each of the reed valves 124a-l curling or being similarly deformed along their length resulting from the expansion of the constituent metals at different rates with regard to temperature. According to aspects of the embodiment, the extent of the deformation of the individual reed valves 124a-l can be proportional to a change of temperature of the fluid space 109 that surrounds the reed valves 124a-l. A first edge of each of the reed valves 124a-l can be attached to the face 130 of the flow valve 132 while a second edge is unrestrained and can be allowed to curl outward from the valve face 130 in response to an increase in temperature in the fluid space 109. The curling outward of the reed valves 124a-l can result in increased fluid flow through the grooves 125a-l because the area by which the reed valves 124a-l cover the corresponding grooves 125a-l is effectively decreased. Furthermore, the curling outward of the reed valves 124a-l in response to increase in temperature can decrease the effective length of each of the reed valves 124a-l, thereby increasing the vibration frequency of each of the reed valves 124a-l.

The flow valve assembly 100 can further include a sensor and/or transmitting component 110 for detecting and relaying properties of the fluid space 109 such as temperatures and pressure. The sensor can be integral to the valve 132, the valve actuator 120, and/or the face portion 108 or a separate component that is carried by any of these portions of the flow valve assembly 100. The sensor can be used to observe the curl of the reed valves 124a-l. The curl or deformation of the reed valves 124a-l can be monitored and compared to a resting state, providing an approximate visual determination of the temperature of the fluid space 109.

In another embodiment, the valve actuator 120 can be formed from fiber optic cables or insulated transducers integrated within a rod or cable, or can include other sensors to detect and communicate data about fluid space 109. Although not shown in FIG. 1, in other embodiments, the flow valve assembly can include other sensors or monitoring instrumentation located at various positions on the flow valve assembly 100. For example, the body 102 can include optical fibers integrated into the material of the body 102. In addition, the flow valve 132 can be configured to sense or carry sensors to transmit data to one or more controllers associated with the movement of valve actuator 120. This data can be transmitted via wireless, wired, optical, or other transmission mediums to an external controller of a mechanical movement means displacing the valve actuator 120 and flow valve 132. The rate and velocity of mechanical movement means driving the valve actuator 120 and flow valve 132 can be adjusted to achieve desired fluid factors and characteristics in the fluid space 109 based on data from the sensor.

In some embodiments, for example, the flow valve assembly 100 can be disposed within and/or attached to a fuel injector and the fluid space 109 can be a combustion chamber. A fuel can be transported into the flow valve assembly 100 through the base portion 104 and carried by the tubes 116a-h through the body 102 into the chamber 112. An actuator of the fuel injector can be connected to the valve actuator 120 and flow valve 132 to inject fuel into the combustion chamber of an engine. As the fuel is propelled into the combustion chamber by the flow valve 132, an acoustical energy is imparted into the fuel.

In another embodiment, the combination of the shape of the flow valve 132 and the pressure drop of a fuel passing through the flow valve 132 into the fluid space 109 instigates an acoustical disturbance that alters a frequency of fuel being dispersed into the fluid space 109, and accordingly controls the spray pattern of the fuel and an associated combustion efficiency improvement.

In certain embodiments, the acoustical frequencies applied to the fuel can be sub-audible frequencies (e.g., less than approximately 20 Hz) or ultrasound frequencies (e.g., above approximately 20000 Hz). In other embodiments, the frequencies can be audible frequencies ranging from about 20 Hz to about 20,000 Hz. The acoustical energy vibrational frequency can be selected based on several factors including the properties of the injector and combustion chamber, as well as fuel type, pressure, temperature, flow rate, etc. For example, a fuel having a relatively high molecular weight may require a relatively higher acoustical energy vibrational frequency applied to the fuel to more quickly initiate and complete combustion. In another embodiment, applying a high frequency, for example a frequency of approximately 2,450 MHz, induces dipolar molecular motion in low-cost fuels having a water component, such as wet alcohol. Such high frequency molecular motion may be generated by an AC or DC microwave driver and may be used in conjunction with one or more additional vibrational drivers at other frequencies. The selected acoustical energy vibrational frequency can also be at least partially based on feedback from the combustion chamber properties (e.g., temperature, pressure, amount of fuel, oxygen, or oxides of nitrogen, ignition initiation and completion, etc.) that can be read by the sensors or detectors described above.

In another embodiment, the frequency of vibration of the reed valves 124$a$-$l$ can be tuned to a resonant frequency of the fluid space 109, which can be, for example, a combustion chamber. The reed valves 124$a$-$l$ are configured to vibrate at the resonant frequency of the combustion chamber, which is determined by several factors, including the type and density of one or more fluids in the combustion chamber, the temperatures of the combustion chamber, and the geometry of the combustion chamber. The flow valve assembly 100 is configured to displace the flow valve 132 and reed valves 124$a$-$l$ attached thereto when a piston in a combustion chamber is at the end of a compression stroke. The tuned reed valves 124$a$-$l$ in this embodiment excited one or more resonant modes thereby causing an increase in pressure on the face of the piston compared to the pressure caused by combustion alone in the combustion chamber.

In a further embodiment, the reed valves 124$a$-$l$ can be configured to vibrate when the flow valve 130 is in a closed position thereby imparting acoustical energy to a second fluid in fluid space 109 different from the first fluid flowing through the flow valve assembly 100. The acoustical energy transmitted to the second fluid can result in the second fluid being in a preferred condition to be mixed with the first fluid when the flow valve 130 is in an open position. The second fluid, for example, can be an oxidant such as air in a combustion chamber and the first fluid, for example, can be a fuel to be injected into a combustion chamber. In order to maximize the temperature produced by combustion of the air and the fuel in the combustion chamber, it may be preferable to have as much air as possible in the center of the chamber prior to combustion. An increased amount of air in the center, as opposed to near the sidewalls of the combustion chamber, can result in a higher temperature in the combustion chamber when the fuel/air mixture is ignited. This can be due to the fact that a decreased amount of heat may escape the combustion chamber through the sidewalls as compared to combustion when air has a relatively even distribution in the combustion chamber.

Any of the actuation-related components disclosed herein (including, but not limited to, actuators, drivers, sensors, valves, and/or flow valve assemblies) can be at least partially made from or coated in any number of suitable materials.

It will be apparent that various changes and modifications can be made without departing from the scope of the disclosure. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

These and other changes can be made to the disclosure in light of the above detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A flow valve assembly for modifying acoustical energy of a fluid, the flow valve assembly comprising:
   a body including—
     a base portion configured to receive the fluid into the body;
     one or more of tubes disposed therein configured to transport the fluid from the base portion through the body; and
     a bore extending therethrough;
   a valve actuator disposed in the bore of the body wherein the valve actuator is configured to be movable between a first position and a second position;
   a flow valve coupled to the valve actuator, wherein the valve is movable to an open position thereby allowing the fluid to flow therefrom, wherein the valve actuator and the valve are configured concentrically;
   a plurality of reed valves adjacent to an outer edge of the flow valve and configured to respond to fluid movement through the flow valve.

2. The flow valve assembly of claim 1 wherein the plurality of reed valves comprises a first metal having a first coefficient of thermal expansion and a second metal having a coefficient thermal of expansion different from the first metal.

3. The flow valve assembly of claim 1 further comprising a sensor configured to register one or more conditions in a fluid space proximate to the flow valve and the reed valves.

4. The flow valve assembly of claim 1 wherein the valve actuator is configured to be acoustically displaced thereby resulting in an oscillation of the flow valve from the open position to a closed position.

5. The flow valve assembly of claim 1 wherein the reed valves vibrate in response to the fluid movement.

6. The flow valve assembly of claim 1 wherein the reed valves are disposed on the flow valve.

7. The flow valve assembly of claim 1 wherein the reed valve is positioned in the fluid flow pathway.

8. The flow valve assembly of claim 1 further including a diaphragm positioned between the flow valve and the reed valves.

9. A method of operating a flow valve assembly to control a flow of a fluid, comprising:
 introducing a first fluid into a body portion of the flow valve assembly, the body portion including a flow valve, the flow valve being movable between an open position and a closed position;
 configuring the flow valve to oscillate from the closed position to the open position to introduce at least a portion of the first fluid into a fluid space adjacent to the flow valve;
 configuring a plurality of reed valves positioned concentrically with the flow valve to vibrate in response to energy imparted by flow of fuel and/or oscillations of the flow valve;
 imparting acoustical energy to at least one of the first fluid, the flow valve, the plurality of reed valves, or a second fluid in the fluid space adjacent to the flow valve.

10. The method of claim 9 wherein imparting acoustical energy comprises transferring energy to alter a vibrational frequency of at least one of the first fluid, the flow valve, the plurality of reed valves or the second fluid in the fluid space adjacent to the flow valve.

11. The method of claim 9, further comprising sensing one or more conditions in the fluid space adjacent to the flow valve, and wherein imparting acoustical energy comprises adaptively altering, in response to the sensing, the movement of the first fluid, the flow valve, the plurality of reed valves or the second fluid in the fluid space adjacent to the flow valve.

12. The method of claim 9 wherein imparting acoustical energy comprises propagating pressure waves of acoustical energy through the first fluid and altering a frequency of vibration in the first fluid.

13. The method of claim 9 wherein imparting acoustical energy comprises controlling the frequency, shape, pattern, and/or phase of a plurality of fluids in the fluid space adjacent to the flow valve.

14. The method of claim 9 wherein imparting acoustical energy comprises subjecting the first fluid to a pressure drop as the first fluid passes through the flow valve into the fluid space adjacent to the flow valve.

15. The method of claim 9 wherein imparting acoustical energy comprises inducing a frequency above about 20,000 Hz in at least one of the first fluid, the flow valve, the plurality of reed valves or the second fluid in the fluid space adjacent to the flow valve.

16. The method of claim 9, further comprising sensing a temperature or pressure in the fluid space adjacent to the flow valve and modifying the frequency, shape, pattern, and/or phase of the first fluid in response to the sensed temperature or pressure.

17. The method of claim 9 wherein the plurality of reed valves is configured to elastically deform in response to a change in temperature in the fluid space adjacent to the flow valve, thereby allowing increased flow of the first fluid from the flow valve assembly.

18. The method of claim 9 wherein the plurality of reed valves is configured to vibrate at a first frequency corresponding to a first temperature in the fluid space adjacent to the flow valve and at a higher frequency than the first frequency in response to an increase in temperature in the fluid space adjacent to the flow valve.

19. The method of claim 9 further comprising configuring the plurality of reed valves to vibrate at one or more frequencies that correspond to one or more resonant frequencies of the fluid space adjacent to the flow valve.

20. A method of operating a flow valve assembly to control a flow of a fluid, the method comprising:
 introducing a first fluid into a body portion of the flow valve assembly, the body portion including a valve actuator, a flow valve, and a plurality of reed valves disposed on the flow valve wherein the flow valve and the plurality of reed valves are configured concentrically;
 sensing one or more conditions in a fluid space exterior to the flow valve; and
 generating acoustical energy to control movement of at least one of the first fluid, the valve actuator, the flow valve, or a second fluid in the fluid space exterior to the flow valve.

21. The method of claim 20 wherein generating acoustical energy comprises inducing vibrations having a vibrational frequency in the valve actuator and opening and closing the flow valve at a regularity dependent on the vibrational frequency.

22. The method of claim 20 wherein generating acoustical energy comprises modifying a frequency, shape, pattern, and/or phase of at least one of the first fluid or the second fluid.

23. The method of claim 20 wherein generating acoustical energy comprises generating acoustical energy having a first frequency, the method further comprising generating acoustical energy having a second frequency different from the first frequency in response to one or more sensed conditions in the fluid space exterior to the flow valve.

* * * * *